Feb. 27, 1945. T. BEGG 2,370,132
CONTAINER
Filed Oct. 22, 1942
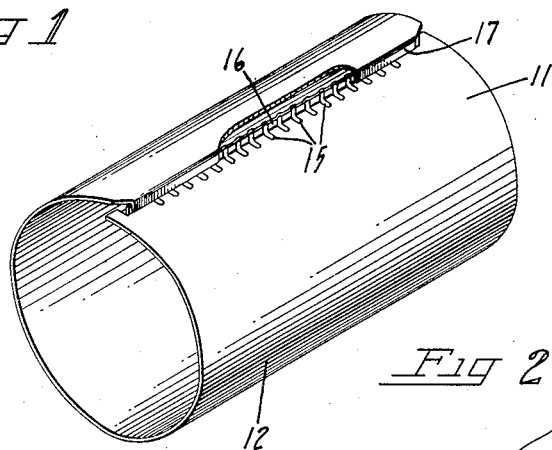
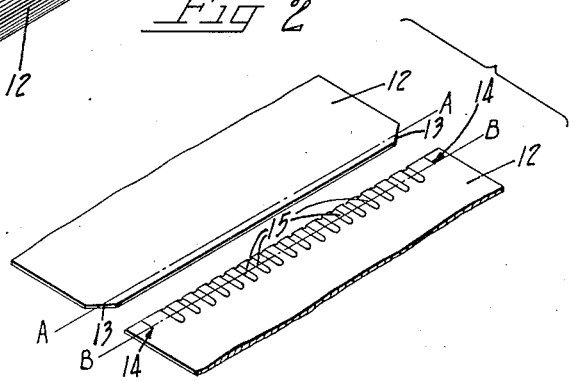
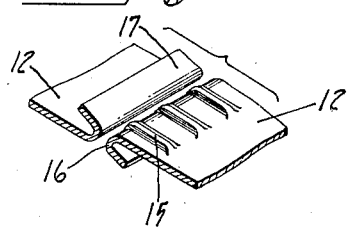
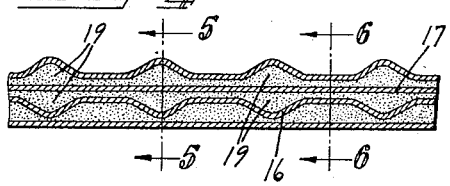
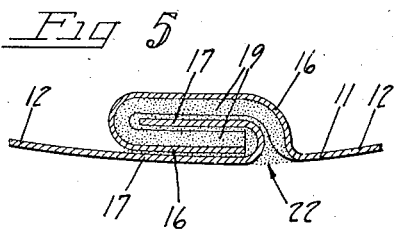
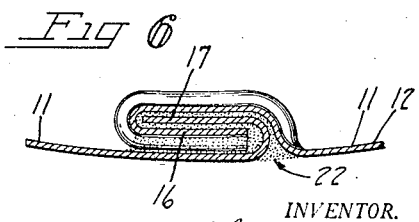
INVENTOR.
Thomas Begg
BY Ivan D. Hornburgh
Charles H. Ence
ATTORNEYS Patented Feb. 27, 1945

2,370,132

UNITED STATES PATENT OFFICE 2,370,132

CONTAINER

Thomas Begg, Nutley, N. J., assignor to American Can Company, New York, N. Y., a corporation of New Jersey Application October 22, 1942, Serial No. 462,993

2 Claims. (Cl. 220—81)

This invention relates in general to sheet metal containers with side seams having interengaged and soldered reversely bent hooks, and has particular reference to spaced corrugations in the body wall projecting laterally from one of said hooks to provide channels extending into and throughout the side seam for the flow of molten solder into the seam to bond the hooks together.

It is the usual practice in making can bodies from sheet metal to prepare a body blank by shaping oppositely disposed marginal edge portions thereof to provide reversely bent hooks which are interlocked during the formation of the side seam. These hooks extend substantially from end to end of the can body, terminating short of each end where they merge into lap sections of the seam provided to facilitate subsequent flanging of the can body.

The instant invention is directed to such a side seam in which the cooperating hooks are secured together by solder and wherein one of the hooks is formed with transverse corrugations which extend from the outer terminal edge of the hook and around the bend in the hook so that when the hook sections are interlocked, a plurality of transverse channels or passages are provided from the exterior of the can body into and throughout the side seam and between the layers of metal thereof for the free flow of molten solder into all parts of the side seam to bond the layers of metal together.

An object of the invention is the provision of a sheet metal can body having a side seam of novel construction comprising a pair of reversely bent and interlocked hooked sections, wherein one of the hooks is formed with a plurality of spaced portions or corrugations projecting laterally from a surface thereof, such portions extending around the bends in the hook and which provide transverse channels throughout the width of the seam and between the metal layers thereof to permit the free flow or penetration of molten or fluid solder into the spaces between all the layers of metal of the interlocked hooks thereby producing a side seam of maximum strength.

Another object of the invention is the provision of such a side seam having channels or grooves in one of the hooked sections, such channels leading from the exterior of the can body so that the molten solder may be readily flowed into the seam and between all of the layers of the side seam parts to bond the adjacent surfaces of the hooked sections together.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a partially completed sheet metal can body having an uncompleted side seam, embodying the present invention and illustrating the formed blank from which the body is made, with its reversely bent hook edges interengaged as an incident to bumping the hooks to complete the side seam prior to soldering;

Fig. 2 is a perspective view of the oppositely disposed side seam edges of a body blank prior to the forming of the hooks shown in Fig. 1, and illustrating the transverse corrugations in one of the side seam margins;

Fig. 3 is an enlarged fragmentary detail of the side seam edges shown in Fig. 2 after the hook forming operation and prior to the hook edges being interengaged as shown in Fig. 1;

Fig. 4 is a longitudinal section of a portion of the completely bumped and soldered side seam drawn to a greatly enlarged scale and illustrating the cross sectional arrangement of corrugations in the spaces between the metal layers of the side seam; and Figs. 5 and 5 are enlarged transverse sectional views of the side seam taken substantially along the respective lines 5—5 and 6—6 of Fig. 4.

As a preferred embodiment of the instant invention there is shown in the drawing a tubular sheet metal can body 11 (Fig. 1), having an incomplete lock and lap side seam as it appears prior to being bumped and soldered in the conventional manner. Such a can body preferably is formed from a previously prepared blank 12 having its opposite or side seam edges clipped and slit as at 13 and 14 (Fig. 2) to provide for the lap section of the completed side seam. The slit edge of the body blank has a series of parallel spaced portions formed as corrugations or indents 15 projecting laterally from a surface thereof and formed transversely of the side seam edge and extending from the outer terminal edge of the blank.

The side seam edge portions of such a blank 12 are folded in the usual manner along longitudinal lines of fold (indicated as A—A and B—B in Fig. 2) to produce a pair of reversely bent inner and outer hooks 16, 17 (Figs. 1 and 3). These form the lock section of the completed seam. Along the slit edge of the body blank, i. e., the edge on which the inner hook 16 is formed, the bending takes place across the corrugations 15 and thus produces a hook in which the corrugations extend around the line of bend and along the bent portion of the hook to its outer terminal edge.

Following their formation the hooks 16, 17 are interengaged (as shown in Fig. 1) and then are bumped or pressed together in the usual manner to interlock them in the side seam (Figs. 5 and 6). In such a bumping action the contour of the corrugations largely is retained while the hooks are folded together into four substantially parallel layers of metal with three intervening spaces.

As a result of the bumping action the corrugations set off within the spaces between the layers of metal of the seam, a plurality of parallel channels 19 which extend across or transversely of the seam and which provide free or clear circuitous passageways throughout the entire width of the seam and around the bends in the hooks. As clearly shown in Fig. 5, these corrugations extend back far enough into the body wall adjacent the line of bend of the outer hook 17 to form continuing channel openings 22 around this hook. These openings 22 are disposed adjacent the exterior surface of the cam body and are located along the outer edge of the seam that receives the flux and the solder when the seam is subjected to its soldering operation.

The soldering operation immediately follows the bumping of the hooks 16, 17 and this usually is effected by passing the cam body over a solder roll rotating in a bath of molten solder. During such a soldering operation the rotation of the solder roll forces the solder up into the seam adjacent the bend in the outer hook 17.

In the instant invention this soldering action is greatly facilitated by the channels 19. The channel openings 22 provide for the reception of a greater amount of solder from the roll and the channels 19 winding through the spaces of the seam, provide for the free flow and uniform distribution of this received solder into all parts of the seam. Any air or solder gas that would be trapped in a conventional seam during a usual soldering operation is liberated and not trapped as it is pushed ahead by the incoming fluid solder flowing through the channels. In other words, such air and gases are expelled or vented through the channels escaping inside the bend in the outer hook 17.

In this manner the circuitous channels 19 insure that all spaces between the layers of metal of the side seam hooks are completely filled with solder. This results in a side seam in which all of the layers of metal of the hooks are thoroughly bonded together. Such a side seam is highly desirable in cans carrying products which are required to be packed under vacuum or high pressures.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet metal can body having a soldered side seam, comprising two reversely bent interengaged hooks forming a plurality of alternate layers of metal having spaces therebetween, one only of said hooks having a plurality of spaced preformed corrugations formed therein, the other of said hooks being substantially straight throughout its longitudinal extent and free of any corrugated portions, said corrugations in said first mentioned hook extending transversely of and completely around the bend of said hook throughout the entire width of the seam, said corrugations in said first mentioned hook setting off a plurality of circuitous enlarged tubular channels between the engaged layers of metal of the hooks for the free flow of molten solder into all parts of the side seam to bond together the layers of metal, said channels further serving as a means for venting the seam by expelling entrained air and solder gas in advance of the solder into the interior of the can body.

2. A sheet metal can body having a soldered side seam, comprising an inner and an outer hook, said hooks being interengaged to form a plurality of alternate layers of metal having spaces therebetween, said inner hook only having a plurality of spaced preformed corrugations extending completely around the bend of the hook and entirely across the side seam from the interior to the exterior of said cam body, the outer of said hooks being substantially straight throughout its longitudinal extent and free of any corrugated portions, said corrugations in the inner hook setting off a plurality of circuitous enlarged tubular channels between the engaged layers of metal of the hooks and spaced longitudinally of the can body for the free flow of molten solder into and through said seam to bond together the layers of metal, said channels further serving as a means for venting the seam by expelling entrained air and solder gas in advance of the solder into the interior of the can body.

THOMAS BEGG.